United States Patent [19]

Oda et al.

[11] 4,321,046

[45] Mar. 23, 1982

[54] ELECTRONIC LEARNING AID OPERABLE IN AN EXAMINATION MODE

[75] Inventors: Koiti Oda, Sakai; Yoshiro Kataoka, Hitoyoshi; Takashi Sakaue, Nara, all of Japan

[73] Assignee: Sharp Kabushiki Kaisha, Osaka, Japan

[21] Appl. No.: 98,077

[22] Filed: Nov. 28, 1979

[30] Foreign Application Priority Data

Nov. 29, 1978 [JP] Japan ............................. 53-148053

[51] Int. Cl.³ .................................... G09B 19/02
[52] U.S. Cl. ........................................ 434/201
[58] Field of Search ............. 434/201, 185, 335, 350, 434/353, 188, 189, 202

[56] References Cited

U.S. PATENT DOCUMENTS

| | | | |
|---|---|---|---|
| 3,154,862 | 11/1964 | Culpepper, Jr. | 434/335 |
| 3,787,988 | 1/1974 | Nakajima et al. | 434/201 |
| 4,010,556 | 3/1977 | Ellsworth et al. | 434/201 |
| 4,012,852 | 3/1977 | Journot et al. | 434/185 |
| 4,051,605 | 10/1977 | Toal et al. | 434/201 |
| 4,051,608 | 10/1977 | Duncan | 434/201 |
| 4,089,124 | 5/1978 | Burts et al. | 434/201 |
| 4,117,607 | 10/1978 | Gill | 434/201 |
| 4,217,656 | 8/1980 | Hirano et al. | 434/201 |

Primary Examiner—Vance Y. Hum
Attorney, Agent, or Firm—Birch, Stewart, Kolasch & Birch

[57] ABSTRACT

An electronic learning aid is disclosed, which automatically develops and displays problems, and functions to compare an answer introduced by a student with a correct answer stored in the electronic learning aid. A mode selection switch is provided for selectively placing the electronic learning aid in an exercise mode and in an examination (test) mode. In the exercise mode, a symbol display is energized for displaying information as to whether the introduced answer is correct or not upon every introduction of the answer by the student. In the examination (test) mode, the symbol display is not conducted, and a percentage score is displayed after completion of a series of problems.

4 Claims, 4 Drawing Figures

ELECTRONIC LEARNING AID OPERABLE IN AN EXAMINATION MODE

BACKGROUND AND SUMMARY OF THE INVENTION

The present invention relates to an electronic learning aid and, more particularly, to an examination made of operation in an electronic learning aid.

An electronic learning aid has been developed, which automatically provides and displays problems of mathematics. Students introduce their answer through key input means after calculation with figures. The electronic learning aid functions to compare the introduced answer with a correct answer stored therein.

A typical construction of a fully electronically controlled learning aid is described in copending application, ELECTRONIC LEARNING AID, Ser. No. 952,203, filed on Oct. 17, 1978 by Takashi Sakaue, Koichi Hatta, Megumi Fukusaki and Yoshiro Kataoka, and assigned to the same assignee as the present application.

In the conventional electronic learning aid, a determination result as to whether the introduced answer is correct or not is displayed upon every introduction of the answer through the key input means. However, this type of operation is not preferable when it is desired to examine the faculty of the student.

Accordingly, an object of the present invention is to provide an electronic learning aid operable in an examination mode, wherein a determination result as to whether an introduced answer is correct or not is not displayed and thus remains secret after introduction of an answer through a key input means.

Another object of the present invention is to provide an electronic learning aid which is selectively operative in a normal exercise mode, a test mode and a free problem mode.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, pursuant to an embodiment of the present invention, in an examination mode, a determination result as to whether an introduced answer is correct or not is not displayed on a display panel after introduction of an answer through a key input means, but, the number of correct answers is accumulated and stored in a counter. After completion of a series of problems, the contents stored in the counter is utilized to calculate a score.

In a preferred form, a problem which has been incorrectly answered is memorized in a storage means. The thus stored problem is once again displayed on a display panel after completion of the examination mode of operation.

If the electronic learning aid is placed in the free problem mode, a student can introduce free problems through a key input means of his choice.

BRIEF DESCRIPTION OF THE DRAWINGS

The present invention will be better understood from the detailed description given hereinbelow and the accompanying drawings which are given by way of illustration only, and thus are not limitative of the present invention and wherein:

FIGS. 3(A) and 3(B) are schematic plan views of display conditions achieved by a display panel included in the electronic learning aid of FIG. 1.

DESCRIPTION OF THE PREFERRED EMBODIMENTS

Figure 1:
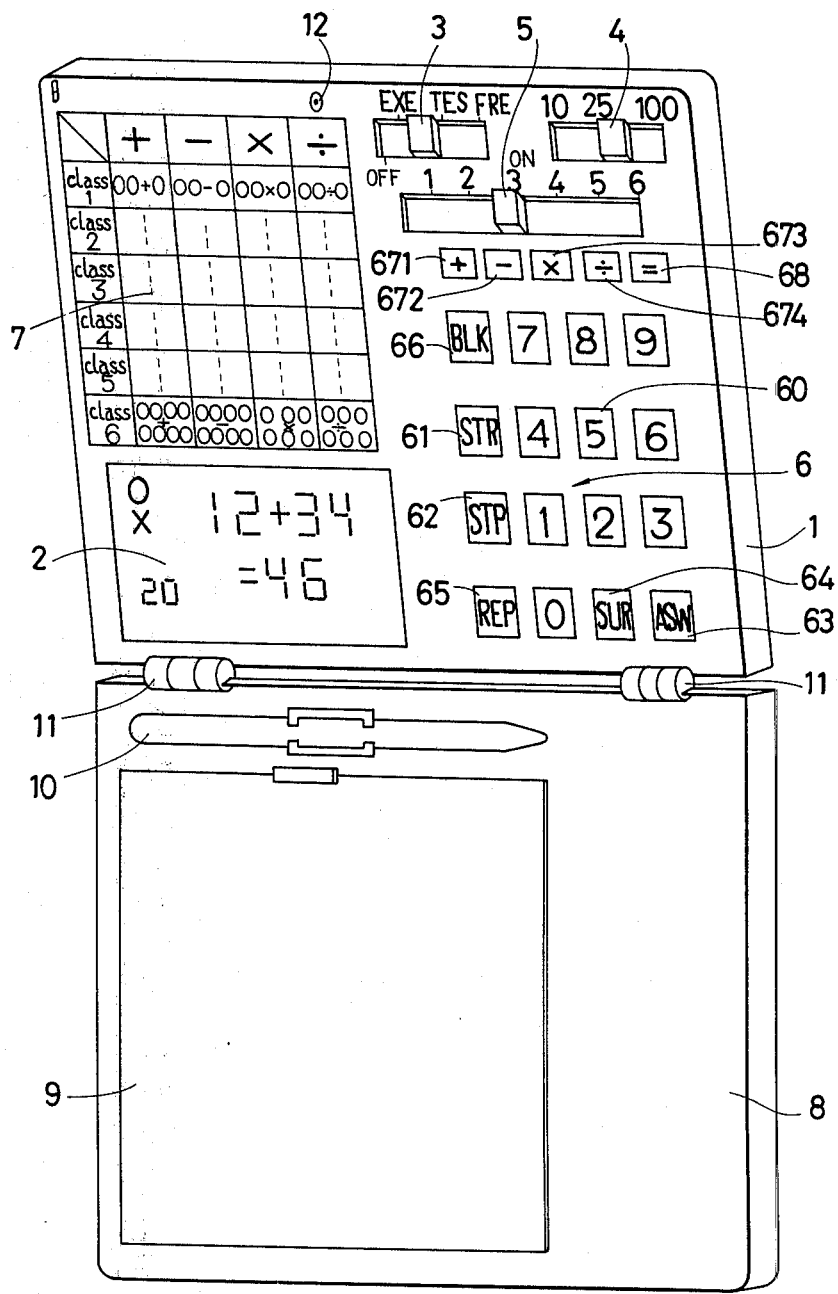
FIG. 1 is a perspective view of an embodiment of an electronic learning aid of the present invention.

FIG. 1 shows an embodiment of an electronic learning aid of the present invention.

The electronic learning aid mainly comprises a display panel 2, a key input means 6, a memorandum note 9, and a table of levels of difficulty 7. A main cabinet 1 encloses an electronic assembly and a power source. The display panel 2 comprises two rows of display units of plural digits for displaying problems, answers, and various information. A mode selection switch 3 is provided for selecting the operation mode among OFF, exercise mode, examination (test) mode, and free problem mode. A problem number selection switch 4 is provided for selecting the number of problems among "10", "25" and "100". A slidable switch 5 is provided for selecting a desired level of difficulty.

The key input means 6 includes numeral keys 60, and function keys. The function keys comprise a start key 61, a stop key 62, an answer key 63, a surplus key 64, a repeat key 65, a blank position selection key 66, an equal key 68, a plus key 671, a minus key 672, a multiplication key 673, and a division key 674. The function keys 671, 672, 673 and 674 are used for selecting the kind of problems in the exercise mode and in the test mode, and for introducing arithmetic operation instructions in the free problem mode.

Another cabinet 8 is rotatably secured to the main cabinet 1 through hinges 11. The memorandum note 9 and a pencil 10 are supported by the cabinet 8. A power supply switch 12 is disposed on the cabinet 1 so that the power supply switch 12 is switched on when the main cabinet 1 is rotated to open the electronic learning aid.

Figure 2:
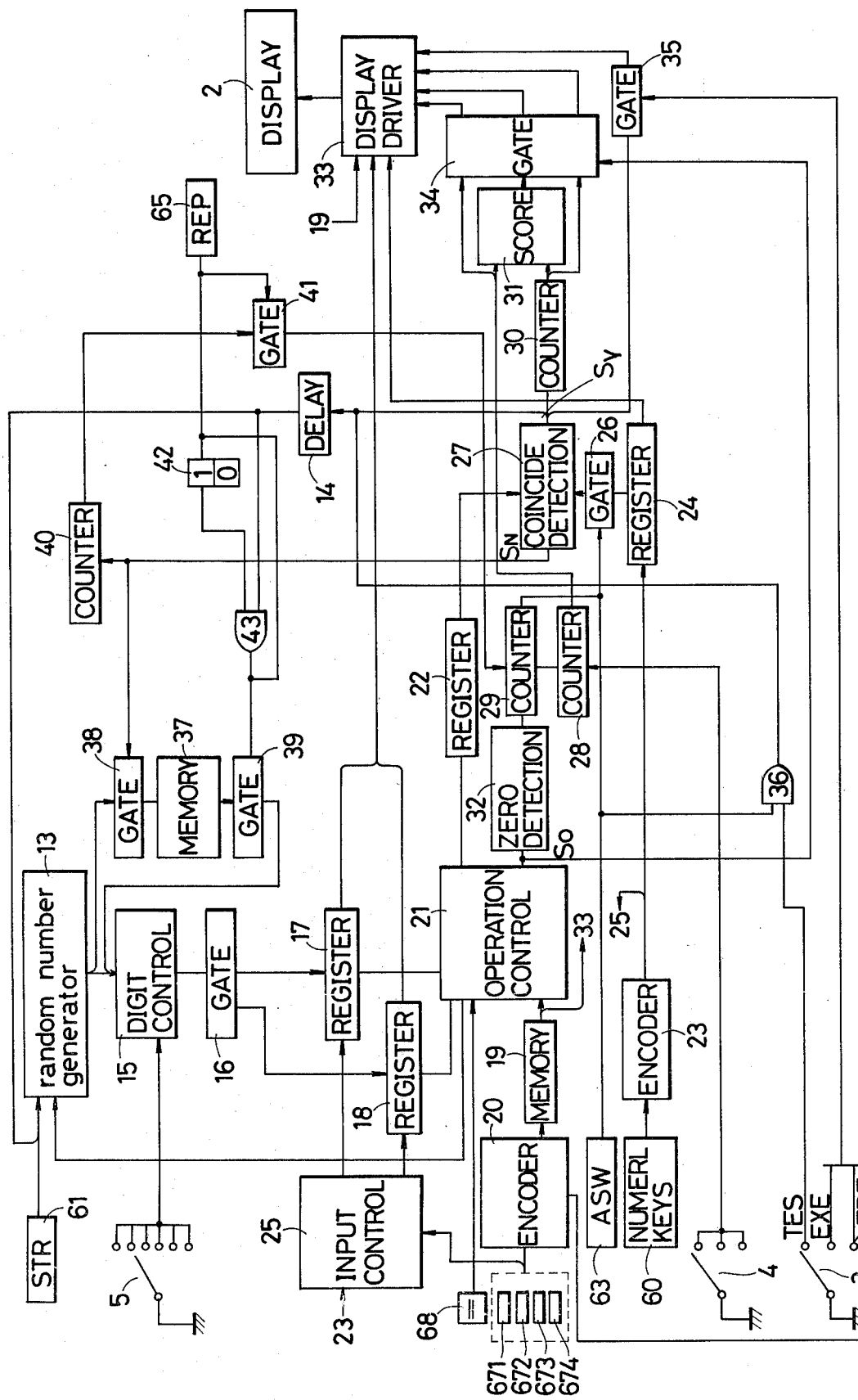
FIG. 2 is a block diagram of an electronic assembly of the electronic learning aid of FIG. 1.

FIG. 2 shows an electronic assembly of the electronic learning aid of the present invention. In FIG. 2, the stop key 62, the surplus key 64 and the blank position selection key 66 are omitted for the purpose of simplicity. Like elements corresponding to those of FIG. 1 are indicated by like numerals.

A random number generator 13 is provided for automatic problem generation purposes. The random number generator 13 sequentially develops the random number of plural digits, when the start key 61 is actuated, in response to an output signal derived from a delay circuit 14. The thus developed random number is applied to a digit number control circuit 15, which functions to develop a random number of a preselected digit number which is determined by the slidable switch 5. The thus obtained random number is applied to an input selection gate circuit 16, which selects a predetermined portion of the random number, whereby the predetermined portions of the random number are introduced into first and second registers 17 and 18, respectively.

A problem kind memory 19 is connected to the function keys 671, 672, 673 and 674 through a key encoder 20 for storing a problem kind code signal corresponding to a problem kind selected by the function keys 671, 672, 673 and 674. The contents stored in the registers 17 and 18, and in the problem kind memory 19 are applied to an operation control circuit 21, which performs the arithmetic calculation and develops the calculation result to a third register 22.

The above-mentioned automatic problem generation feature is described, in detail, in copending application, ELECTRONIC LEARNING AID, Ser. No. 952,203, filed on Oct. 17, 1978 by Takashi Sakaue, Koichi Hatta, Megumi Fukusaki and Yoshiro Kataoka, and assigned to the same assignee as the present application and, therefore, the detailed description thereof has been omitted for the purpose of simplicity.

The numeral keys 60 are used to introduce an answer in the excercise mode and in the examination (test) mode, and to introduce a desired operand in the free problem mode. The answer introduced through the numeral keys 60 is applied to a fourth register 24 via a key encoder circuit 23. The operand introduced through the numeral keys 60 in the free problem mode is applied to an input control circuit 25, which functions to apply the operand introduced before any one of the function keys 671, 672, 673 and 674 is actuated to the first register 17, and the operand introduced after actuation of the function key 671, 672, 673 or 674 to the second register 18. In the free problem mode, the operation control circuit 21 performs the arithmetic calculation, upon actuation of the equal key 68, in accordance with the information stored in the first and second registers 17 and 18 and in the problem kind memory 19. The answer is introduced into and stored in the third register 22.

A gate circuit 26 is turned on upon actuation of the answer key 63, whereby the answer introduced through the numeral keys 60 and stored in the fourth register 24 is applied to a coincidence detection circuit 27. The coincidence detection circuit 27 functions to compare the answer stored in the fourth register 24 with a correct answer stored in the third register 22. If the two contents are identical with each other, a coincidence detection output $S_Y$ is developed, which is applied to the delay circuit 14 for developing the next problem through the random number generator 13. If the two contents are not identical with each other, a non-coincidence detection output $S_N$ is developed.

First and second counters 28 and 29 are connected to the problem number selection switch 4 for storing a preselected problem number. The contents introduced into the first counter 28 are maintained unchanged till the series of the exercise or examination problems are completed. The contents stored in the second counter 29 are reduced by one upon every actuation of the answer key 63. The coincidence detection output $S_Y$ derived from the coincidence detection circuit 27 is also applied to a third counter 30 for counting the correct answers. Upon completion of the series of problem generation, the content stored in the first and third counters 28 and 30 are applied to a score calculation circuit 31 for calculating the percentage score [(the number of correct answers)÷(the preselected number of problems)×100].

A zero detection circuit 32 is connected to the second counter 29 for developing a zero detection output $S_O$ when the contents stored in the second counter 29 are reduced to zero. Upon development of the zero detection output $S_O$, the operation control circuit 21 terminates its operation, and a gate circuit 34 is turned on, whereby the contents stored in the first counter 28, the third counter 30 and the score calculation circuit 31 are applied to a display driver circuit 33 for display purposes.

The coincidence detection output $S_Y$ developed from the coincidence detection circuit 27 is further applied to the display driver circuit 33 through a gate circuit 35. The gate circuit 35 is conductive when the exercise mode or the free problem mode is selected by the mode selection swtich 3. The gate circuit 35 is nonconductive if the examination (test) mode is selected, whereby the correct/wrong display as to the introduced answer is not displayed after every answer in the examination (test) mode.

That is, in the examination (test) mode, the coincidence detection circuit 27 performs the determination operation, but the student can not know whether the now introduced answer is correct or not.

The display driver circuit 33 receives the output signals derived from the first and second registers 17, 18, the problem kind memory 19, the fourth register 24, and the gate circuits 34 and 35, whereby the problem, the introduced answer, the determination results as to whether the introduced answer is correct or not, the preselected problem number, the number of correct answers, the score, etc. are displayed on the display panel 2.

The operation control circuit 21 develops a control signal toward the random number generator 13 for correctively redeveloping the random number when the calculation result obtained by the operation control circuit 21, in accordance with the contents stored in the problem kind memory 19 and in the first and second registers 17 and 18, is not a proper value.

In the examination (test) mode, the problems are sequentially developed with a predetermined time interval without regard to the fact whether the introduced answer is correct or not. An AND gate 36 is made conductive only in the examination (test) mode, which develops an output signal upon every actuation of the answer key 63 in the examination (test) mode. The thus developed output signal is applied to the delay circuit 14, whereby the next problem is developed after a predetermined time period when the answer key 63 is actuated in the examination (test) mode.

In the examination (test) mode, if the introduced answer is not correct, the random number for the problem which has be erroneously answered is introduced into and stored in a random number memory 37. More specifically, the non-coincidence detection output $S_N$ derived from the coincidence detection circuit 27 is applied to an input gate circuit 38 for introducing the random number for the problem which has been erroneously answered into the random number memory 37. The non-coincidence detection output $S_N$ is also applied to a fourth counter 40 for counting the number of problems which have been erroneously answered. The random number memory 37 can memorize a plurality of random numbers for developing the problems again.

After completion of a series of problems in the examination (test) mode, when the repeat key 65 is actuated, a gate circuit 41 is turned on, whereby the contents stored in the fourth counter 40 are applied to the second counter 29. At the same time, an R-S flip-flop 42 is set to make conductive and AND gate 43. An output gate circuit 39 is turned on to develop the random numbers stored in the random number memroy 37 in response to the output signal derived from the delay circuit 14. To perform the repeat operation, the digit number control circuit 15 is constructed not to receive the data from the random number generator 13 when the repeat key 65 is actuated. Accordingly, the problems which have been erroneously answered are sequentially developed and displayed on the display panel 2.

Figures 3A, 3B:
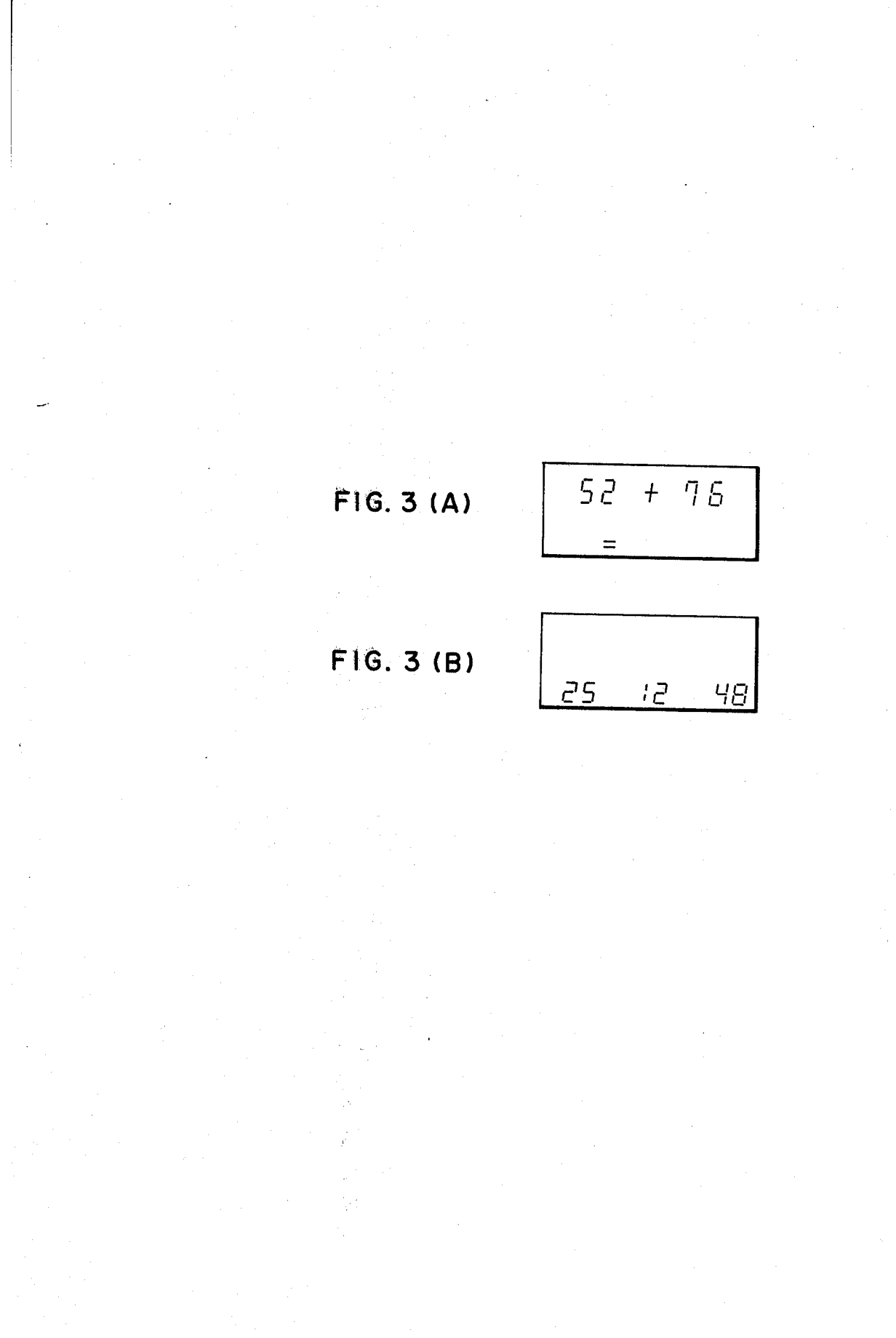

FIGS. 3(A) and 3(B) show examples of the display condition performed by the display panel 2.

Now assume that the mode selection switch 3 is placed in the exercise mode. A desired kind of problems is selected through the use of the function keys 671, 672, 673, 674, and the problem number selection switch 4 and the slidable switch 5 are placed in desired positions. Thereafter, the start key 61 is actuated. The random number is generated by the random number generator 13, which is applied to the first and second registers 17 and 18 through the digit number control circuit 15 and the input selection gete circuit 16.

If the plus key 671 has been actuated, the operation control circuit 21 performs the arithemetic calculation "A+B" ("A" is the random number stored in the first register 17, and "B" is the random number stored in the second register 18). The calculation result is applied to the third register 22. The display driver circuit 33 functions to display the contents stored in the registers 17 and 18, and a symbol "+" corresponding to the data stored in the problem kind memory 19 on the display panel 2. FIG. 3(A) shows a condition where the registers 17, 18 and 22 store the numbers "52", "76" and "128", respectively, in the exercise mode of the addition problems.

The student introduces his answer through the numeral keys 60 after calculation with figures. The thus introduced answer is introduced into the fourth register 24. Under these conditions, when the answer key 63 is actuated, the coincidence detection circuit 27 functions to compare the contents stored in the registers 22 and 24. If the two contents are identical with each other, the coincide detection output $S_Y$ is developed from the coincidence detection circuit 27, which is applied to the display driver circuit 33, through the gate circuit 35 for displaying the symbol "o" on the display panel 2.

If the mode selection switch 3 is placed in the examination (test) mode, the gate circuit 35 is not conductive and, therefore, the symbol display as to whether the introduced answer is correct or not is not conducted.

When the predetermined number of problems have been answered, the zero detection circuit 32 develops the zero detection output $S_O$ to turn to the gate circuit 34 for displaying the number of problems which have been developed, the number of correct answers, and the percentage score on the display panel 2 as shown in FIG. 3(B).

In the examination (test) mode, the AND gate 36 develops the output signal upon every actuation of the answer key 63, which enables the delay circuit 14. Accordingly, in the examination (test) mode, the next problem is developed without regard to the fact of whether the introduced answer is correct or not.

When the mode selection switch 3 is placed in the free problem mode, the operator can introduce any kind of problems through the key input means 6. If, for example, the input keys are actuated in the order of 5, 2, +, 7, 6 and =, the input control circuit 25 functions to introduce the data "52", "76", and a code signal corresponding to the addition into the registers 17 and 18 and the problem kind memory 19, respectively. The operation control circuit 21 conducts the arithmetic calculation, and the calculation result "128" is introduced into the third register 22. The remaining operation is similar to that achieved in the exercise mode.

The invention being thus described, it will be obvious that the same may be varied in many ways. Such variations are not to be regarded as a departure from the spirit and scope of the invention, and all such modifications are intended to be included within the scope of the following claims.

What is claimed is:

1. An electronic learning aid for teaching addition, subtraction, multiplication, or division, comprising:

means for automatically generating a multidigit problem having two operands and an arithmetic function;

display means for displaying said problem;

input means for introducing an operator calculated answer for said problem;

calculation means for determining the correct answer to said problem;

comparator means for comparing the operator calculated answer to said correct answer and producing a correct answer signal upon their coincidence;

a mode selection switch for selectively placing said electronic learning aid in an exercise mode or an examination mode;

correct answer indicator display means responsive to said correct answer signal for indicating whether the operator calculated answer is correct; and prohibition means for inhibiting said correct answer indicator display means when said learning aid is in the examination mode.

2. The learning aid of claim 1 further comprising:

first counter means for counting the operator introduced correct answers;

second counter means for counting the total number of operator introduced answers; and;

score calculating means responsive to said first and second counter means for calculating a percentage score.

3. The learning aid of claim 1 or 2 further comprising:

means for storing the actual problems answered incorrectly by the operator in said examination mode; and means for redisplaying said actual problems stored in said means for storing after completion of a series of problems in the examination mode.

4. The learning aid of claim 3 further comprising:

answer display means for the correct answer to said problem;

said prohibiting means further inhibiting said answer display means when in said examination mode.

* * * * *